Feb. 28, 1928.  1,660,784
H. BLANKSTEN
RESISTANCE ELEMENT FOR ELECTRIC IRONS AND THE LIKE
Filed May 8, 1922  2 Sheets-Sheet 1
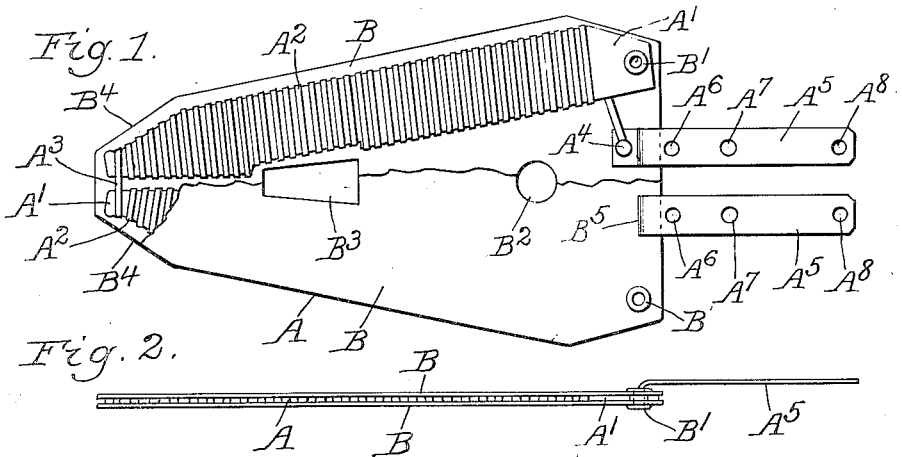
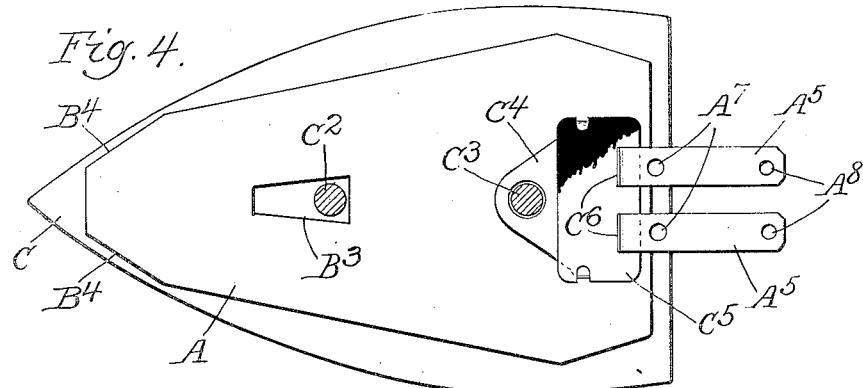
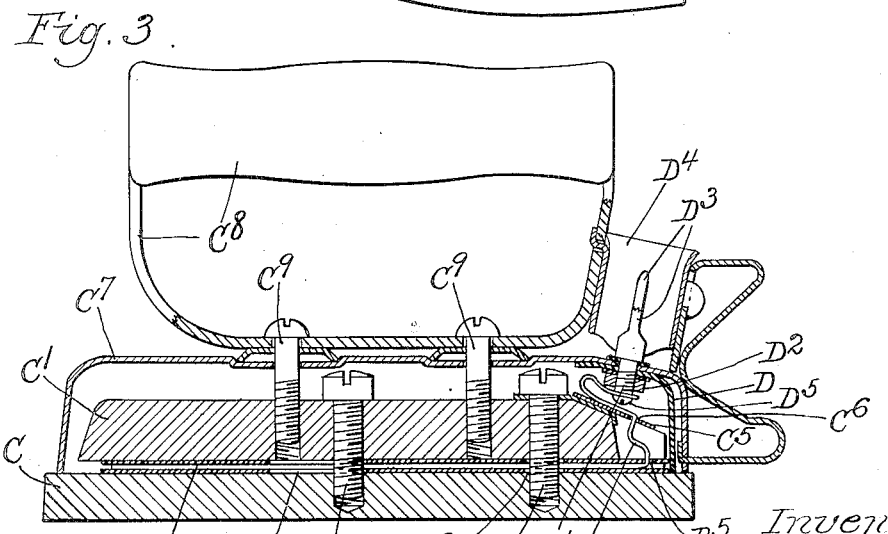
Witness.
Edward T. Wray.
Inventor
Hyman Blanksten.
by Parker & Carter
Attorneys.

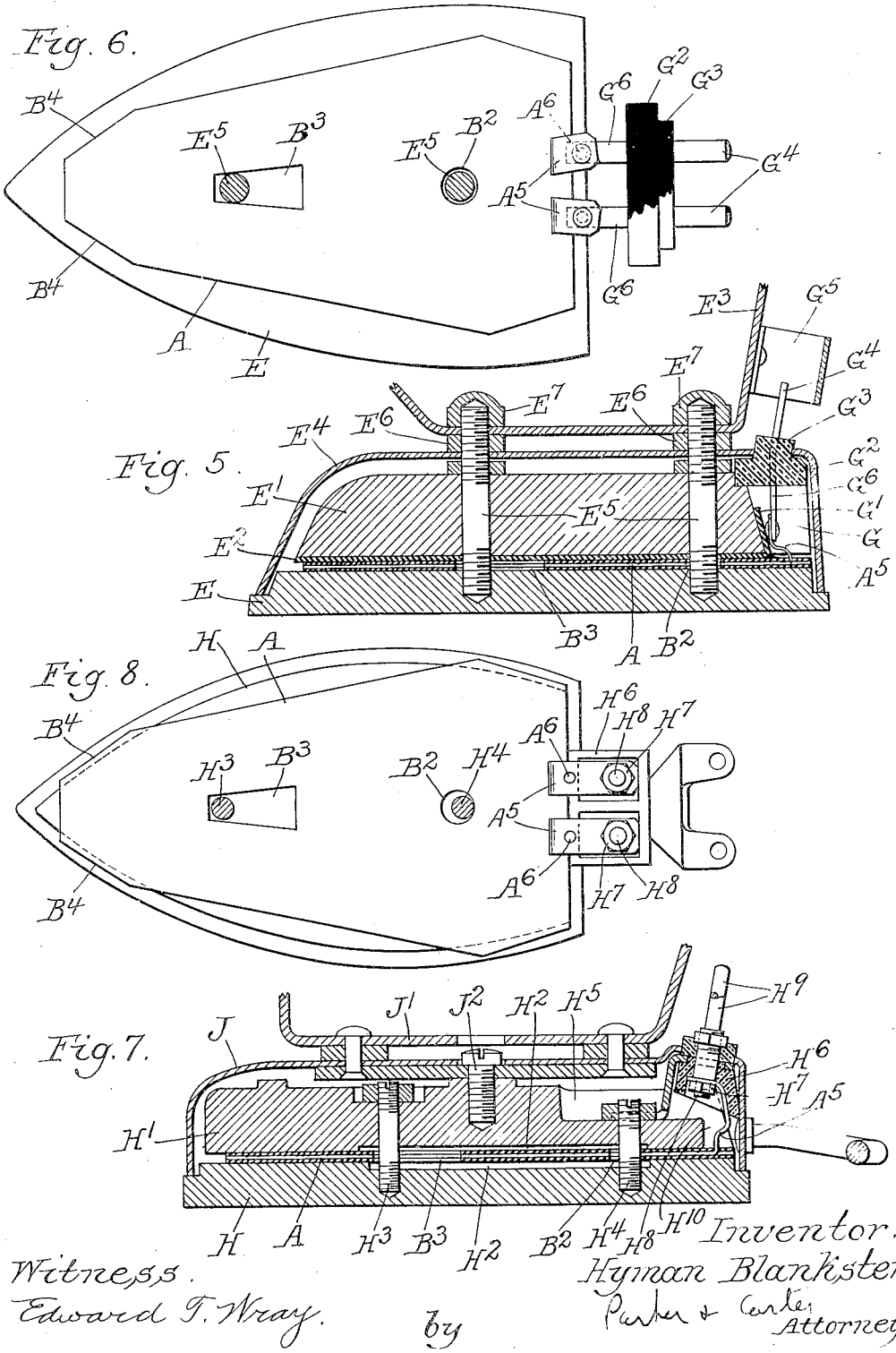

Patented Feb. 28, 1928.

1,660,784

UNITED STATES PATENT OFFICE.

HYMAN BLANKSTEN, OF CHICAGO, ILLINOIS.

RESISTANCE ELEMENT FOR ELECTRIC IRONS AND THE LIKE.

Application filed May 8, 1922. Serial No. 559,347.

My invention relates to improvements in resistance elements for electric irons and the like, and has for one object to provide a new and improved type of resistance element which will be easily and conveniently interchangable for use in various types of commercial electric irons.

All electric irons comprise a sole plate of polished metal, a pressure plate preferably of cast iron or some other heat-retaining material, an insulated electrical resistance element contained between the pressure plate and the sole plate, means for holding together a cover for the iron with a handle for the operator, and electric terminals projecting into the cover and contacting with the resistance element, whereby a conductor may be attached in order to heat the iron.

The various types of commercial irons on the market are closely similar in general size, shape and form, but they vary in details connected with the terminals, the shape or contour of the iron and the position of the holding pins or cores that pass through the iron and hold the parts together and clamp the resistance element in place.

My resistance element is provided with electrical connections whereby it may be connected to different kinds of terminals. The element is shaped to fit snugly into any commercial form of iron and to be propely held in place by the differently positioned holding pins of the various irons, it being apertured to permit one holding pin always to be in close engagement with one aperture, another serving to complete the centering or positioning of the element on the iron, it being understood that the distance between the holding pins varies with the various irons. The heat cores or terminals are properly cut away or insulated from the various pin or core positions.

My invention is illustrated more or less diagrammatically in the accompanying drawings, wherein—

Fig. 1 is a plan view with parts broken away showing the heating element;

Fig. 2 is a side view of a heating element;

Fig. 3 is a vertical section through a flatiron showing the heating element in place;

Fig. 4 is a view of the flatiron shown in Fig. 3 with the pressure plate removed;

Fig. 5 is a section through another type of iron, showing the heating element in place;

Fig. 6 is a plan view of the same iron, showing the heating element in place on the sole plate;

Fig. 7 is a section through a third type of iron;

Fig. 8 is a view of the iron of Fig. 7, similar to Fig. 6.

Like parts are indicated by like characters throughout the drawings.

A is a heating element which comprises two converging flat strips $A^1$ and each spirally wound about with a flat strip of the appropriate metal $A^2$, the strip joining the two inclined insulating strips, as at $A^3$, and being secured adjacent the end of each of the insulating strips, as at $A^4$, to a flexible, flat, metallic contact strip $A^5$, which is perforated at a plurality of points, as at $A^6$, $A^7$ $A^8$.

The two converging strips, together with the heating material thereupon, are confined between two thin layers of insulating and heat-resisting material B, preferably some form of mica. These layers or plates are shaped roughly to conform to the outer edges of the two inclined, insulating, resistance material carrying strips, and are secured together through the most widely separated ends of said strips, as at $B^1$ $B^1$. In order to adapt the heating unit to the various irons with which it is to be used, in which the securing bolts pass through the heating element at various points, I align a plurality of apertures down the central axis of the resistance element. The number and arrangement of these apertures may be varied to furnish a maximum flexibility and adaptability of use. For the purpose of illustration, I have shown the resistance element herein provided with two perforations. They are perforated as at $B^2$ by a circular perforation of relatively large size along the central axis of the heating element and spaced well away from the resistance material. They are also perforated as at $B^3$ on the central axis and nearer the front or narrow end, this perforation taking the form of a highly inclined, truncated triangle. This perforation is likewise out of line with the resistance material proper, which may, if necessary, be recessed slightly at this point. The narrow end of the resistance material and the mica sheets is tapered as at $B^4$ $B^4$, to economize in space and fit the flatiron. The upper of the mica sheets is perforated as at $B^5$ $B^5$, to permit the flat terminal element to penetrate therethrough. It will be understood that this type of heating element is adapted for use with all the different types of flatiron herein described.

In the flatiron shown in Fig. 3, C is the sole plate, upon which lies the resistance element A, as above described. Superposed on it is the pressure plate or slab $C^1$, which is secured to the sole plate by the two screws or bolts $C^2$ $C^3$, of which $C^2$ passes through the large end of the aperture $B^3$ while $C^3$ passes through the circular aperture $B^2$. The screw or bolt $C^3$ likewise holds in position, by the perforated yoke $C^4$, the flat, thin, insulating plate $C^5$, preferably of mica, which is apertured as at $C^6$ $C^6$ to permit the passage of the contact strips $A^5$. $C^7$ is the cover of the flatiron, to which is secured the handle $C^8$ by the screws $C^9$ $C^9$, which pass through the cover $C^7$ and penetrate the pressure plate $C^1$.

Mounted in the rear of the cover $C^7$, overlying the mica insulating plate $C^5$, is a similar curved insulating plate D, which is held in place by the bolts $D^1$ and the nuts $D^2$, each bolt $D^1$ continuing as the contact element $D^3$, which lies within the external socket $D^4$. The bolts $D^1$ are themselves axially perforated by a screwthreaded aperture into which penetrate the screws $D^5$, which pass through the apertures $A^8$ of the strips $A^5$ and thus make the contact.

In the form of flatiron shown in Figs. 5 and 6, E is the sole plate, upon which is placed the pressure plate $E^1$, the bottom surface of which is covered with an insulating layer $E^2$, which rests upon the heating element A. The handle $E^3$ and the cover $E^4$ are secured into place over the sole plate and pressure plate by the screws or stud bolts $E^5$ $E^5$ and the nuts $E^6$ $E^7$. One of the screws or stud bolts $E^5$ passes through the circular aperture $B^2$ of the heating element and the other passes through the forward or narrow end of the aperture $B^3$. The pressure plate is recessed at its rear end as at G, and the asbestos layer is carried up therethrough, as at $G^1$. $G^2$ is a block of any suitable insulating material, the upper portion $G^3$ of which is adapted to extend upwardly through the cover $E^4$, and mounted in the block are a plurality of contact elements, the upper ends $G^4$ of which extend upwardly through the guard or socket $G^5$ mounted on the handle $E^3$. The lower ends $G^6$ are perforated and secured to the ends of the strips $A^5$ opposite the asbestos layer $G^1$. If desired, the strips $A^5$ may be cut off adjacent the apertures $A^6$, to which the contact elements may be directly secured.

In the form of flatiron shown in Figs. 7 and 8, H is the sole plate, over which lies the pressure plate $H^1$, H and $H^1$ being centrally recessed in opposition to each other, as at $H^2$. Lying between them is the heating element A. The pressure plate is secured to the sole plate, as, for example, by the bolts or screws $H^3$ $H^4$, $H^4$ passing through the circular aperture $B^2$ and $H^3$ passing through the forward or narrow end of the aperture $B^3$. The top of the pressure plate is recessed above the bolt $H^4$, as at $H^5$, and secured in any suitable way therein is an insulating housing $H^6$, which overlies the rear of the depression $H^5$, and an indentation $H^{10}$ at the rear of the pressure plate. This indentation permits the upward passage of the strips $A^5$, which are preferably cut off just above the apertures $A^7$ and secured by the nut $H^7$ and bolt $H^8$ to the bottom of the contact element $H^9$, which projects upwardly through the insulated housing $H^6$. J is the cover of the flatiron, to which is secured in any suitable way the handle $J^1$, the cover being screwed to the pressure plate as by $J^2$.

It will be understood that while I have shown and described an operative device, still many changes might be made in the size, shape, number and relation of parts without departing from the spirit of my invention. I wish, therefore, that my drawings be regarded as in a sense diagrammatic.

The use and operation of my invention are as follows:

There are on the market to-day a large number of electric irons of different types, which all have certain common characteristics. Practically without exception, they comprise a sole plate and a pressure plate or weight, and a flat resistance element insulated from the pressure and the sole plates and firmly secured between them. The attachment generally takes the form of some bolt or screw, which penetrates through the heating element and tightly secures the sole and pressure plates together. The electric connection to the heating element is prevailingly made at the rear of the flatiron, but the details in the various makes of flatiron differ widely. Since in the electrical supply and repair business it is necessary to be able to replace the resistance elements as they wear or burn out, and since it is necessary to also replace elements for all of the various makes, it is highly desirable to provide a standard or universal heating or resistance element which may be applied to any form of flatiron.

The three problems involved are: First, to provide a resistance element which will fit the outline of all the standard flatiron makes. The second problem is to provide an element which is so formed as to permit the passage therethrough of the variously spaced securing means. The third problem is to provide an electric connection which may be secured easily and quickly to any of the different types of flatiron. As to the first, the problem is simple, since the flatirons are, in general, of similar outline; and I have therefore provided a resistance element which is properly tapered at the end and properly proportioned to fit within any of the flatirons on the market. In order that the resistance element may be adapted for use with a large number of flat irons of different type, wherein the securing bolts pass through the resistance element at various points, I align a plurality of apertures down the center of the resistance element, the number of which may be varied to give the maximum of adaptability and flexibility.

I may even dispense with the bridge of insulating material between the apertures, the essential feature being that the resistance element is so apertured as to receive penetrating, securing means, no matter where said securing means are located along the central axis of the iron. I have illustrated herein a resistance element provided with two apertures, a front and a rear one. Since the rear fastening in most of the flatirons is at about the same point, I use a circular aperture large enough to take the largest screw. The forward aperture I shape as shown in Figs. 4, 6 and 8, to allow for various positioning of the forward connection. I incline it from front to rear because in the irons it so happens that those with a screw of small cross-section place it farther forward than do those having a screw or bolt of large-cross-section at this point. Both the front and rear apertures might be made of widely different shapes to care for greater divergences of size, shape and positioning of the securing means. At the rear of the heating element I provide two contact strips, which are made flat and flexible in order that they may be easily fastened to electric connections of different position. I make them of considerable length and perforate them at three points, although obviously a larger or smaller number of perforations might be used. The extreme length and the last perforation serve as a connection for the type of flatiron shown in Fig. 3. The type of Fig. 7 calls for a connecting unit of lesser length, and the operator may therefore snip off the thin, flexible metal above the aperture $A^7$. In the form shown in Fig. 5 the minimum length of connecting strip is necessary, and it may be cut off above the aperture $A^6$.

To apply my heating element to the various types of flatiron it is simply necessary to open them or remove the separable parts in the usual manner, lay the heating element in place, and then trim the flexible strips off to the appropriate length, and bolt or otherwise secure it to the appropriate connection for the flatiron in question. This can all be done instantaneously and calls for no special tools.

I claim:

1. A flat interchangeable heat unit for flat irons including a suitable flat resistance element and a support therefor comprising apertured heat resistant sheet members of irregular outline, the position of the apertures and the irregular outline being designed for the universal application of the unit to flat irons of different shapes with clamping elements to penetrate the apertures in various positions on different irons.

2. A flat interchangeable heat unit for flat irons including a suitable flat resistance element and a support therefor comprising apertured heat resistant sheet members of irregular outline, the position of the apertures and the irregular outline being designed for the universal application of the unit to flat irons of different shapes with clamping elements to penetrate the apertures in various positions on different irons, and electric contact members comprising flat, flexible metal ribbons perforated at a plurality of points intermediate their ends to receive terminals of the irons at different points according to the position of the terminals on the iron to which the element is applied.

3. A flat interchangeable heat unit for flat irons including a suitable flat resistance element, and insulating heat resistant apertured sheet members for enclosing the resistance element having an irregular marginal contour with means for securing the sheet members together to form a flat element to be clamped between flat faced members of the irons, the position and shape of the apertures and the irregular outline being designed for the universal application of the unit to flat irons of different shapes.

Signed at Chicago, county of Cook, and State of Illinois, this 6th day of May, 1922.

HYMAN BLANKSTEN.